US012630660B2

(12) United States Patent
Zhou et al.

(10) Patent No.: US 12,630,660 B2
(45) Date of Patent: May 19, 2026

(54) AQUEOUS DISPERSION OF POLYMER PARTICLES AND USES THEREOF AS AN ADHESIVE COMPOSITION

(71) Applicant: Arkema France, Colombes (FR)

(72) Inventors: Hua Zhou, Changshu City (CN); Leo Mario Saija, Boretto (IT)

(73) Assignee: Arkema France, Puteaux (FR)

( * ) Notice: Subject to any disclaimer, the term of this patent is extended or adjusted under 35 U.S.C. 154(b) by 847 days.

(21) Appl. No.: 17/641,140

(22) PCT Filed: Sep. 24, 2020

(86) PCT No.: PCT/EP2020/076696

§ 371 (c)(1),
(2) Date: Mar. 8, 2022

(87) PCT Pub. No.: WO2021/058639

PCT Pub. Date: Apr. 1, 2021

(65) Prior Publication Data

US 2022/0332866 A1 Oct. 20, 2022

(30) Foreign Application Priority Data

Sep. 24, 2019 (EP) .................................... 19306184

(51) Int. Cl.

| | |
|---|---|
| ***C08F 212/08*** | (2006.01) |
| ***C08F 2/26*** | (2006.01) |
| ***C08F 2/38*** | (2006.01) |
| ***C08F 220/06*** | (2006.01) |
| ***C08F 220/14*** | (2006.01) |
| ***C08F 220/18*** | (2006.01) |
| ***C08F 230/02*** | (2006.01) |
| ***C08F 230/08*** | (2006.01) |
| ***C08K 5/21*** | (2006.01) |
| ***C09J 133/12*** | (2006.01) |

(52) U.S. Cl.

CPC .......... *C08F 220/1802* (2020.02); *C08F 2/26* (2013.01); *C08F 2/38* (2013.01); *C08F 212/08* (2013.01); *C08F 220/06* (2013.01); *C08F 220/14* (2013.01); *C08F 230/02* (2013.01); *C08F 230/085* (2020.02); *C08K 5/21* (2013.01); *C09J 133/12* (2013.01); *C09J 2203/334* (2013.01); *C09J 2301/30* (2020.08); *C09J 2301/408* (2020.08); *C09J 2405/00* (2013.01); *C09J 2425/00* (2013.01); *C09J 2433/00* (2013.01)

(58) Field of Classification Search

CPC .. C08F 220/1802; C08F 230/085; C08F 2/26; C08F 2/38; C08F 212/08; C08F 220/06; C08F 220/14; C08F 230/02; C08K 5/21; C09J 133/12; C09J 2301/30; C09J 2301/408; C09J 2203/334; C09J 2405/00; C09J 2425/00; C09J 2433/00

USPC .......................................................... 524/806

See application file for complete search history.

(56) References Cited

U.S. PATENT DOCUMENTS

| | | | | |
|---|---|---|---|---|
| 3,857,803 | A * | 12/1974 | Shenfeld | C09J 135/06 40/310 |
| 9,670,389 | B2 | 6/2017 | Cisowski et al. | |
| 2004/0076785 | A1 | 4/2004 | Richards et al. | |
| 2008/0060756 | A1* | 3/2008 | Schnieders | C09J 7/10 525/383 |

FOREIGN PATENT DOCUMENTS

| | | | | |
|---|---|---|---|---|
| CN | 1212985 | A | 7/1999 | |
| CN | 103619979 | A | 3/2014 | |
| EP | 413136 | A * | 2/1991 | C08K 5/0025 |
| EP | 0413136 | A2 | 2/1991 | |
| WO | WO 2014004196 | A1 | 1/2014 | |
| WO | WO2016087255 | A1 | 6/2016 | |

* cited by examiner

*Primary Examiner* — Kelechi C Egwim
(74) *Attorney, Agent, or Firm* — Debodhonyaa Sengupta

(57) ABSTRACT

The present invention relates to an aqueous dispersion of polymer particles and its preparation process, to an adhesive composition comprising the aqueous dispersion and to the use of the adhesive composition for adhering a label on a bottle.

20 Claims, No Drawings

AQUEOUS DISPERSION OF POLYMER PARTICLES AND USES THEREOF AS AN ADHESIVE COMPOSITION

CROSS-REFERENCE TO RELATED APPLICATIONS

This application is a national stage application under 35 U.S.C. § 371 of PCT/EP2020/076696, filed Sep. 24, 2020 which claims benefit to application EP19306184.3, filed Sep. 24, 2019.

FIELD OF THE INVENTION

The present invention relates to an aqueous dispersion of polymer particles and its preparation process, to an adhesive composition comprising said aqueous dispersion and to the use of the adhesive composition for adhering a label on a bottle.

TECHNICAL BACKGROUND

Aqueous adhesives are used for adhering paper labels on beverage bottles, in particular glass bottles such as soda or beer bottles. The adhesives used for labelling bottles must exhibit excellent water resistance so that the label remains on the bottle even when placed in contact with water or ice to chill the beverage contained in the bottle. However, the adhesive must also be readily removable in a hot and caustic bath so as to not impede the recycling of the bottles.

Binders that are generally used for labelling adhesives include casein, a starch and starch derivatives. Casein is costly and its use is progressively being reduced.

Recently, alkali-soluble or alkali-swellable acrylic copolymers have been introduced in labelling adhesives in replacement of part or all of the casein binder.

For example, WO 2014/004196 A1 discloses an aqueous adhesive composition comprising an acrylic emulsion polymer and an epoxysilane for adhering paper labels on glass bottles. While the adhesive is said to exhibit good iced water resistance and removal in a hot caustic bath, it does not meet the requirements of water resistance of some countries. Indeed, some countries require excellent performances in specific environments. Accordingly, while Europe and America are more focused on the resistance of the label in iced water, Asian countries, and particularly China, require a resistance in water at room temperature of at least 10 days.

To achieve such performances, there is a need to develop specific emulsion polymers to be used as the main binder of an aqueous adhesive for labels. The aqueous dispersion of polymer particles should exhibit one or more of the following properties:

(a) compatibility with casein;
(b) compatibility with the other components of the adhesive composition, e.g. starch, crosslinker;
(c) good rheological properties, i.e. matching the rheological behaviour of casein, including suitable range of initial tack, adhesion to a glass substrate, viscosity, compatibility with high speed labelling machines;
(d) quick drying time at low temperatures (0-5° C.);
(f) excellent water-resistance, especially at cold temperature (0-5° C.) and even in room temperature water (20-25° C.);
(g) cost effective;
(h) excellent removal in a hot caustic bath for bottle recycling;

(i) high thickening power by neutralization of acid functions with a base; and
(j) good resistance to heating during the application phase.

SUMMARY OF THE INVENTION

A first object of the present invention is an aqueous dispersion of polymer particles obtained from a monomeric composition comprising:

a) a non-ionic aliphatic monoethylenically unsaturated monomer;
b) a non-ionic styrenic monomer;
c) an ethylenically unsaturated monomer comprising an acidic group; and
d) an ethylenically unsaturated monomer comprising a silane group.

Another object of the present invention is a process for the preparation of an aqueous dispersion of polymer particles by emulsion polymerization of the monomeric composition according to the invention.

Yet another object of the present invention is an adhesive composition comprising the aqueous dispersion according to the invention or as obtained with the process according to the invention.

Another object of the present invention is the use of the adhesive composition according to the invention for adhering a label on a bottle, in particular a glass bottle.

DETAILED DESCRIPTION

Definitions

As used herein, the term "(meth)acrylate" means methacrylate or acrylate. In one embodiment, the (meth)acrylate is an acrylate. In another embodiment the (meth)acrylate is a methacrylate.

As used herein, the term "aqueous dispersion" means a polyphasic system having a dispersed organic phase and a continuous aqueous phase.

As used herein, the term "substantially free of organic solvents" means less than 2%, preferably less than 1%, more preferable 0% by weight of organic solvent based on the weight of the aqueous phase.

As used herein, the term "non-ionic" refers to a monomer that does not bear an ionic charge at a pH of 1 to 14.

As used herein, the term "aliphatic" refers to a monomer that does not comprise an aromatic group. Aliphatic monomers may be saturated or unsaturated, linear or branched, cyclic or acyclic.

As used herein the term "ethylenically unsaturated" means a monomer that comprises a polymerizable carbon-carbon double bond. A polymerizable carbon-carbon double bond is a carbon-carbon double bond that can react with another carbon-carbon double bond in a polymerization reaction. A polymerizable carbon-carbon double bond is generally comprised in an acryloyl ($-C(=O)-CH=CH_2$), methacryloyl ($-C(=O)-C(CH_3)=CH_2$) or vinyl ($-CH=CH_2$) group. The carbon-carbon double bonds of a phenyl ring are not considered as polymerizable carbon-carbon double bonds.

As used herein the term "monoethylenically unsaturated" means a monomer that comprises only one polymerizable carbon-carbon double bond. A conjugated diene is considered as a monoethylenically unsaturated as there is only one of the carbon-carbon double bonds that participates in the polymerization reaction.

As used herein, the term "soft monomer" means a monomer that forms a homopolymer with Tg of 0° C. or lower, in particular −20° C. or lower.

As used herein, the term "hard monomer" means a monomer that forms a homopolymer with a Tg of 30° C. or higher, in particular 50° C. or higher.

As used herein, the term "styrenic" refers to a monomer that contains a carbon-carbon double bond in alpha position to an aromatic ring. Examples of aromatic rings include optionally substituted rings selected from benzene, biphenyl, indene, naphthalene, anthracene and mixtures thereof.

As used herein the term "acidic group" means a group that can be anionised through loss of a proton. For example, a carboxylic acid functional group may form a carboxylate anion under basic conditions.

As used herein the term "phosphorus-based acid monomers" means a monomer comprising an acidic group that comprises a phosphorus atom.

As used herein the term "sulfur-based acid monomers" means a monomer comprising an acidic group that comprises a sulfur atom.

As used herein, the term "silane group" means a group comprising a carbon-silicon bond (C—Si). The silane group may further comprise a silicon-oxygen bond (Si—O).

Aqueous Dispersion

The aqueous dispersion of the invention comprises polymer particles dispersed in an aqueous phase.

The aqueous phase is a liquid comprising water. Said liquid may further comprise organic solvents, such as, for example, ethanol. However, the aqueous phase is preferably substantially free of organic solvents.

The organic phase may be a monomer phase, a polymer phase or a mixture thereof. Said organic phase may further comprise other liquid, solid or semi-solid components, such as surfactants, plasticizers, chain transfer agents and buffering agents. A dispersion having a liquid organic phase may be referred to as an emulsion. A dispersion having a solid or semi-solid organic phase may be referred to as a colloidal suspension. In the field of polymers, such colloidal suspensions are also inaccurately referred to as emulsions, and the process for preparing them is called emulsion polymerization. Another term commonly used for characterizing an aqueous dispersion of polymer particles is "latex".

In one embodiment, the solids content of the aqueous dispersion is in the range of 10 to 70% by weight, in particular 30 to 60% by weight.

In one embodiment, the polymer particles may exhibit a volume average particle size of 50 to 500 nm, in particular 60 to 200 nm. The volume average particle size may be determined by dynamic light scattering or laser diffraction.

In one embodiment, the polymer particles may exhibit a glass transition temperature (Tg) of −10 to 50° C., in particular 0 to 40° C., more particularly 10 to 30° C. The Tg may be determined by DSC according to the method described herein.

The polymer particles of the present invention are based on a combination of specific monomers. Accordingly, the polymer particles are obtained from a monomeric composition comprising at least four different monomers a), b), c) and d) as defined below. In other words, the polymer particles comprise polymerized units derived from monomers a), b), c), and d). The polymer particles may be obtained by emulsion polymerization of the monomeric composition in water.

The monomeric composition comprises monomers a), b), c), and d) and optionally one or more compounds selected from an initiator, another copolymerizable monomer, a chain transfer agent, a crosslinker, a surfactant, a buffer and mixtures thereof. Any water added for the emulsion polymerization of the monomeric composition is not considered part of the monomeric composition and is therefore not counted in the total weight of the monomeric composition.

The monomeric composition comprises monomer a). Monomer a) is a non-ionic aliphatic monoethylenically unsaturated monomer. Monomer a) may be a mixture of non-ionic aliphatic monoethylenically unsaturated monomers.

Monomer a) may comprise 2 to 30 carbon atoms and a group selected from acryloyl (—C(═O)—CH═$CH_2$), methacryloyl (—C(═O)—C($CH_3$)═$CH_2$) and vinyl (—CH═$CH_2$).

In one embodiment, monomer a) may be selected from an alkyl (meth)acrylate, a hydroxyalkyl (meth)acrylate, an optionally substituted (meth)acrylamide, (meth)acrylonitrile, a conjugated diene, an alpha-olefin, a vinyl ester, a vinyl ether, a vinyl halide, and mixtures thereof.

In particular, monomer a) may be selected from alkyl (meth)acrylates such as methyl acrylate, ethyl acrylate, butyl acrylate, methyl methacrylate, butyl methacrylate, tert-butyl methacrylate and 2-ethylhexyl acrylate; hydroxyalkyl (meth)acrylates such as 2-hydroxyethyl acrylate and 2-hydroxyethyl methacrylate; optionally substituted (meth)acrylamides such as acrylamide, N,N-dimethylacrylamide and diacetone acrylamide, (meth)acrylonitriles such as acrylonitrile and methacrylonitrile; conjugated dienes such as butadiene, isoprene and pentadiene; alpha-olefins such as ethylene, propene, 1-butene, isobutylene, diisobutylene, 1-nonene and 1-decene; vinyl esters such as vinyl acetate, vinyl propionate, vinyl hexanoate, vinyl 2-ethylhexanoate, vinyl octanoate, vinyl pelargonate, vinyl caproate, neo esters of vinyl alcohol, vinyl laurate and vinyl versatate; vinyl ethers such as methyl-, ethyl-, butyl- and iso-butyl vinyl ether; vinyl halides such as vinyl chloride; and mixtures thereof.

In one embodiment, monomer a) comprises a C1-C12 alkyl (meth)acrylate, in particular a C1-C4 alkyl (meth) acrylate, more particularly a C1-C2 alkyl (meth)acrylate. Monomer a) may comprise a mixture of C1-C12 alkyl (meth)acrylates, in particular a mixture of C1-C4 alkyl (meth)acrylates, more particularly a mixture of C1-C2 alkyl (meth)acrylates. A C1-C12 alkyl (meth)acrylate is an alkyl (meth)acrylate having 1 to 12 carbon atoms in the alkyl chain. Suitable C1-C12 alkyl (meth)acrylates include methyl acrylate, ethyl acrylate, propyl acrylate, butyl acrylate, methyl methacrylate, ethyl methacrylate, propyl methacrylate, butyl methacrylate, 2-ethylhexyl acrylate, in particular ethyl acrylate, butyl acrylate and methyl methacrylate.

In one embodiment, monomer a) comprises at least 50%, at least 60%, at least 70%, at least 80%, at least 90%, at least 95%, at least 99% or 100% by weight of C1-C12 alkyl (meth)acrylate based on the total weight of monomer a). In particular, monomer a) may comprise at least 50%, at least 60%, at least 70%, at least 80%, at least 90%, at least 95%, at least 99% or 100% by weight of C1-C4 alkyl (meth) acrylate based on the total weight of monomer a). More particularly, monomer a) may comprise at least 50%, at least 60%, at least 70%, at least 80%, at least 90%, at least 95%, at least 99% or 100% by weight of C1-C2 alkyl (meth) acrylate based on the total weight of monomer a).

More particularly, monomer a) may be selected from an alkyl (meth)acrylate and mixtures thereof. Even more particularly, monomer a) may be selected from ethyl acrylate, butyl acrylate, methyl methacrylate and mixtures thereof.

More particularly still, monomer a) may be a mixture of ethyl acrylate and methyl methacrylate.

In one embodiment, monomer a) is a mixture comprising non-ionic aliphatic monoethylenically unsaturated monomers having different glass transition temperatures (Tg), in particular a mixture comprising soft and hard non-ionic aliphatic monoethylenically unsaturated monomers. Without wishing to be bound by theory, it is believed that the combination of soft and hard monomers in monomer a) leads to an adhesive having improved mechanical strength. The amount of hard and soft monomer may be adjusted so that the resulting polymer particles exhibit a suitable Tg, i.e. −10 to 50° C., in particular 0 to 40° C., more particularly 10 to 30° C.

The monomeric composition may comprise 40 to 90%, in particular 45 to 85%, more particularly 50 to 80%, even more particularly 55 to 75%, more particularly still 60 to 70%, by weight of monomer a) based on the total weight of monomers a)+b)+c).

The monomeric composition may comprise 34 to 85%, in particular 38 to 80%, more particularly 43 to 75%, by weight of monomer a) based on the total weight of the monomeric composition.

The monomeric composition comprises monomer b). Monomer b) is a non-ionic styrenic monomer. Monomer b) may be a mixture of non-ionic styrenic monomers. Without wishing to be bound by theory, it is believed that the hydrophobicity and high Tg of monomer b) imparts water resistance and cohesion to the resulting polymer particles.

In one embodiment, monomer b) may be selected from styrene, alpha-methylstyrene, tert-butylstyrene, ortho-, meta-, and para-methylstyrene, ortho-, meta- and para-ethylstyrene, o-methyl-p-isopropylstyrene, p-chlorostyrene, p-bromostyrene, o,p-dichlorostyrene, o,p-dibromostyrene, ortho-, meta- and para-methoxystyrene, optionally substituted indenes, optionally substituted vinylnaphthalenes, acenaphthylene, diphenylethylene, vinyl anthracene and mixtures thereof. In particular, monomer b) may be selected from styrene, alpha-methylstyrene and mixtures thereof.

The monomeric composition may comprise 0.01 to 30%, in particular 0.1 to 20%, more particularly 1 to 10%, even more particularly 2 to 8%, more particularly still 3 to 7%, by weight of monomer b) based on the total weight of monomers a)+b)+c).

The monomeric composition may comprise 0.008 to 28%, in particular 0.08 to 19%, more particularly 0.8 to 9.4%, by weight of monomer b) based on the total weight of the monomeric composition.

The monomeric composition comprises monomer c). Monomer c) is an ethylenically unsaturated monomer comprising an acidic group and salts thereof. Monomer c) may be a mixture of ethylenically unsaturated monomers comprising an acidic group and salts thereof. Without wishing to be bound by theory, polymer particles obtained from monomers comprising an acidic group may advantageously be capable of swelling. Indeed, polymer particles comprising acidic groups may become more hydrophilic and swell through absorption of water when they are neutralized with a base such as ammonia water. As such, the incorporation of acidic groups in polymer particles results in an adhesive that can be easily removed in hot alkaline conditions. Further, the neutralization of the acidic groups results in an increase of viscosity of the aqueous dispersion and thus facilitates the application of the adhesive on bottles during the labelling process.

In one embodiment, monomer c) may be selected from C3-C10 mono- or dicarboxylic acid monomers, phosphorous-based acid monomers, sulfur-based acid monomers, salts thereof and mixture thereof.

In particular, monomer c) comprises an acidic group selected from a carboxylic acid (—COON) group, a carboxylate (—$COO^-$) group, a phosphonic acid (—P(═O)$(OH)_2$) group, a phosphonate (—P(═O)$(OR)_2$) group, a sulfonic acid (—$S({=}O)_2OH$) group, a sulfonate (—$S({=}O)_2OR$) group, a phosphate (—O—P(═O)$(OR)_2$) group, wherein each R is independently a counterion, a hydrogen atom, or an optionally substituted hydrocarbyl.

Monomer c) may comprise 2 to 30 carbon atoms and a group selected from acryloyl (—C(═O)—CH═$CH_2$), methacryloyl (—C(═O)—$C(CH_3)$═$CH_2$) and vinyl (—CH═$CH_2$).

In particular, monomer c) may be selected from (meth) acrylic acid, 2-chloroacrylic acid, vinyl phosphonic acid, vinyl sulfonic acid, p-styrene carboxylic acid, p-styrene sulfonic acid, itaconic acid, maleic acid, maleic anhydride, tetrahydrophthalic acid, tetrahydrophthalic anhydride, fumaric acid, crotonic acid, 3-butenoic acid, mesaconic acid, citraconic acid, 2-carboxyethyl acrylate, sodium 2-acrylamido-2-methyl propane sulfonate, sodium vinyl sulfonate, sodium (meth)allyl sulfonate, sodium 1-allyloxy-2-hydroxypropane sulfonate, a phosphate ester of alkyl (meth)acrylate, a phosphate ester of alkyl (meth)acrylamide, a phosphate ester of alkyl crotonate, a phosphate ester of alkyl maleate, a phosphate ester of alkyl fumarate, a phosphate diester of alkyl (meth)acrylate, a phosphate diester of alkyl crotonate, vinyl phosphate, (meth)allyl phosphate, a phosphate ester of polypropylene glycol mono(meth)acrylate, a phosphate ester of polyethylene glycol mono(meth)acrylate, a phosphate ester of polyoxyethylene allyl ether and mixtures thereof.

In one embodiment, monomer c) may comprise a mixture of a C3-C10 mono- or dicarboxylic acid monomers and a phosphorous-based acid monomer, in particular a mixture of (meth)acrylic acid and a monomer having a phosphonic acid group, a phosphonate group or a phosphate group. In another embodiment, monomer c) may comprise a mixture of a C3-C10 mono- or dicarboxylic acid monomer and a sulfur-based acid monomer, in particular a mixture of (meth)acrylic acid and a monomer having a sulfonic acid group or a sulfonate group.

In one embodiment, monomer c) comprises at least 50%, at least 60%, at least 70%, at least 80%, or at least 90%, by weight of C3-C10 mono- or dicarboxylic acid monomer based on the total weight of monomer c). In particular, monomer c) may comprise at least 50%, at least 60%, at least 70%, at least 80%, or at least 90% by weight of (meth)acrylic acid based on the total weight of monomer c). More particularly, monomer c) may comprise at least 50%, at least 60%, at least 70%, at least 80%, at least 90% by weight of methacrylic acid based on the total weight of monomer c).

More particularly, monomer c) is selected from (meth) acrylic acid, vinyl phosphonic acid, a phosphate ester of alkyl (meth)acrylate, a phosphate ester of polypropylene glycol mono(meth)acrylate and mixtures thereof.

The monomeric composition may comprise 1 to 40%, in particular 5 to 30%, more particularly 10 to 25%, even more particularly 15 to 25%, more particularly still 20 to 25%, by weight of monomer c) based on the total weight of monomers a)+b)+c).

The monomeric composition may comprise 0.8 to 38%, in particular 4 to 28%, more particularly 8 to 24%, by weight of monomer c) based on the total weight of the monomeric composition.

The monomeric composition comprises monomer d). Monomer d) is an ethylenically unsaturated monomer comprising a silane group. Monomer d) may be a mixture of ethylenically unsaturated monomers comprising a silane group.

In particular, monomer d) may comprise an alkoxysilane group. More particularly, monomer d) may comprise an alkoxysilane group having the following formula:

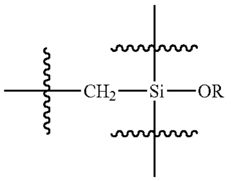

where R is an alkyl, in particular R is an alkyl comprising 1-6 carbon atoms, more particularly R is methyl or ethyl.

In one embodiment, monomer d) may be a monoethylenically unsaturated monomer comprising a dialkoxysilane or a trialkoxysilane group. More particularly, monomer d) may comprise an dialkoxysilane group having the following formula:

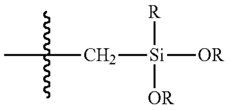

or a trialkoxylsilane group having the following formula:

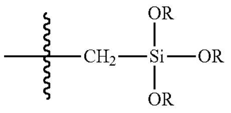

wherein each R is independently an alkyl, in particular an alkyl comprising 1-6 carbon atoms, more particularly methyl or ethyl.

Without wishing to be bound by theory, it is believed that monomer d) may improve the mechanical strength, water-resistance and adhesion of the polymer by establishing crosslinks between the polymer chains. Further, monomer d) may improve the adhesion of the polymer to glass bottles. Indeed, the alkoxysilane groups can be hydrolyzed to form silanol (Si—OH) groups, which can in turn establish hydrogen bonds with free hydroxy groups on the surface of the bottles. Further, since monomer d) comprises an ethylenic unsaturation it may be copolymerized with monomers a), b) and c) and incorporated in the backbone of the polymer particles. Monomer d) is thus different from an external crosslinking agent, i.e. a crosslinking agent that reacts with a polymer after said polymer has been synthesized. The incorporation of a silane-containing monomer in the backbone of the polymer may advantageously protect the silane group from hydrolysis and hence improve the water-resistance of the polymer compared to the use of an external silane crosslinking agent.

Monomer d) may comprise 2 to 30 carbon atoms and a group selected from methacryloyl ($—C(=O)—C(CH_3)=CH_2$) and vinyl ($—CH=CH_2$).

In particular, monomer d) may be selected from 3-methacryloxypropyl tri(alkoxy)silane, methacryloxymethyl tri (alkoxy)silane, 3-methacryloxypropylmethyl di(alkoxy)silane, vinylalkyl di(alkoxy)silane, vinyl tri(alkoxy)silane and mixtures thereof.

More particularly, monomer d) may selected from vinyl trimethoxysilane, vinyl diimethoxymethylsilane, vinyl triethoxysilane, vinyl tripropoxysilane, vinyl triisopropoxysilane, vinyl tris(methoxyethoxy)silane, vinyl tributoxysilane, vinyl triacetoxysilane, 3-methacryloxypropyl trimethoxysilane, 3-methacryloxypropylmethyl dimethoxysilane, methacryloxymethyl trimethoxysilane, 3-methacryloxypropyl tris(2-methoxyethoxy) silane, vinyl trichlorosilane, vinyl methyldichlorosilane, vinyltris(2-methoxyethoxy)silane and mixtures thereof.

Even more particularly, monomer d) may be selected from vinyl trimethoxysilane, 3-methacryloxypropyl trimethoxysilane, 3-methacryloxypropylmethyl dimethoxysilane, methacryloxymethyl trimethoxysilane and mixtures thereof.

The monomeric composition may comprise 0.001 to 10%, in particular 0.1 to 5%, more particularly 0.5 to 4%, even more particularly 1 to 4%, more particularly still 2.5 to 4%, by weight of monomer d) based on the total weight of monomers a)+b)+c).

The monomeric composition may comprise 0.0008 to 9.4%, in particular 0.08 to 4.7%, more particularly 0.4 to 3.8%, by weight of monomer d) based on the total weight of the monomeric composition.

The type and amount of monomers a), b), c) and d) may be adjusted so that the resulting polymer particles exhibit a Tg of −10 to 50° C., in particular 0 to 40° C., more particularly 10 to 30° C.

The monomeric composition may further comprise additional components selected from an initiator, another copolymerizable monomer, a chain transfer agent, a crosslinker, a surfactant, a buffer and mixtures thereof. Preferably, the monomeric composition may further comprise an initiator, a chain transfer agent and a surfactant.

In one embodiment, the monomeric composition comprises an initiator. The initiator may be a water-soluble free radical initiator. Suitable initiators are well known in the art and include, for example, peroxygen compounds, especially inorganic persulfate compounds such as ammonium persulfate, potassium persulfate and sodium persulfate; peroxides such as hydrogen peroxide; organic hydroperoxides such as cumene hydroperoxide, t-butyl hydroperoxide, acetyl peroxide, benzoyl peroxide, lauroyl peroxide; peracetic acid and perbenzoic acid; redox initiators wherein a water soluble reducing agent such as a ferrous compound promotes the decomposition of peroxides, persulfates and the like; as well as other free radical producing materials such as 2,2'-azobisisobutyronitrile, 4,4'-azobis(4-cyanovaleric acid), and the like. In one embodiment, the monomeric composition comprises an initiator selected from ammonium persulfate, potassium persulfate, sodium persulfate and mixtures thereof.

The monomeric composition may comprise 0 to 2%, in particular 0.1 to 1.5%, more particularly 0.2 to 1% by weight of initiator based on the total weight of monomers a)+b)+c).

The monomeric composition may comprise 0 to 1.7%, in particular 0.08 to 1.4%, more particularly 0.17 to 0.95% by weight of initiator based on the total weight of monomeric composition.

In one embodiment, the monomeric composition comprises another copolymerizable monomer. The other copolymerizable monomer may be an ethylenically unsaturated monomer, other than monomers a), b), c) and d), that is capable of copolymerizing with monomers a), b), c) and d).

The monomeric composition may comprise 0 to 10%, in particular 0.1 to 5%, more particularly 1 to 3% by weight of other copolymerizable monomer based on the total weight of monomers a)+b)+c).

The monomeric composition may comprise 0 to 9.4%, in particular 0.08 to 4.7%, more particularly 0.8 to 2.8% by weight of other copolymerizable monomer based on the total weight of monomeric composition.

In one embodiment, the monomeric composition comprises a chain transfer agent. The chain transfer agent may be a compound able to react with a growing polymer chain to form a "dead" polymer with the concurrent formation of a new center for polymer growth. Chain transfer agents are also referred to as molecular weight modifiers. Suitable chain transfer agents are well known in the art and include, for example, thiols such as n-dodecyl mercaptan, tert-dodecyl mercaptan, isooctyl 3-mercaptopropionate, isooctyl mercaptoacetate and 2-ethylhexyl thioglycolate; halocarbons such as carbon tetrachloride and carbon tetrabromide. In one embodiment, the monomeric composition comprises a chain transfer agent comprising a thiol group, more particularly a chain transfer agent selected from n-dodecyl mercaptan, tert-dodecyl mercaptan, isooctyl 3-mercaptopropionate, isooctyl mercaptoacetate or 2-ethylhexyl thioglycolate.

The monomeric composition may comprise 0 to 2%, in particular 0.1 to 1.5%, more particularly 0.5 to 1% by weight of chain transfer agent based on the total weight of monomers a)+b)+c).

The monomeric composition may comprise 0 to 1.7%, in particular 0.08 to 1.4%, more particularly 0.4 to 0.95% by weight of chain transfer agent based on the total weight of the monomeric composition.

In one embodiment, the monomeric composition comprises a crosslinker. The crosslinker may be a multifunctional compound capable of reacting with ethylenically unsaturated monomers. In one embodiment, the monomeric composition comprises a crosslinker bearing at least two polymerizable carbon-carbon double bonds; more particularly a multifunctional (meth)acrylate, a polyvinylic monomer or a compound comprising both a (meth)acrylic group and a vinyl group, even more particularly a crosslinker selected from allyl (meth)acrylate, diallyl (meth)acrylate, vinyl acrylate, divinyl benzene, ethylene glycol dimethacrylate, diallyl phthalate, hexanediol diacrylate, trimethylolpropane triacrylate, pentaerythritol triallyl ether, dicyclopentenyl oxyethyl methacrylate, glycerol triacrylate and mixtures thereof.

The monomeric composition may comprise 0 to 2%, in particular 0 to 1%, more particularly 0 to 0.5% by weight of crosslinker based on the total weight of monomers a)+b)+c).

The monomeric composition may comprise 0 to 1.7%, in particular 0 to 0.95%, more particularly 0 to 0.47% by weight of crosslinker based on the total weight of the monomeric composition.

In one embodiment, the monomeric composition comprises a surfactant. The surfactant may be a compound having both a hydrophilic and a hydrophobic part that is able to form micelles of monomer. In one embodiment, the monomeric composition comprises a surfactant selected from an anionic surfactant, a non-ionic surfactant and mixtures thereof; more particularly C6-C20 alkyl sulfate or sulfonate, C6-C20 alkyl ether sulfate or sulfonate, C6-C20 alkyl phosphate or phosphonate, C6-C20 alkyl ether phosphate or phosphonate, C6-C20 alkyl benzenesulfonate, C4-C18 half esters or diesters of sulfosuccinate, diphenyl oxide disulfonate, ethoxylated fatty alcohol (C10-C40 with an ethoxy unit number ranging from 2 to 100), ethoxy-propoxy copolymer (EO-PO copolymer) and mixtures thereof. Examples of suitable C6-C20 alkyl sulfates and alkyl ether sulfates are sodium, potassium or ammonium salts, in particular sodium salt, of decyl sulfate, lauryl sulfate (like Disponil® SLS), stearyl sulfate, fatty alcohol ether sulfate with 30 EO (like Disponil® FES77), fatty alcohol ether sulfate with 2 EO sodium (like Disponil® FES 27), C12/14 fatty alcohol ether sulfate with 12EO (like Disponil® FES 993) and fatty alcohol ether sulfate with 4 EO (like Disponil® FES 32). Examples of suitable C6-C20 alkyl sulfonates and alkyl ether sulfonates are sodium, potassium or ammonium salts, in particular sodium salt, of decyl sulfonate, lauryl sulfonate and stearyl sulfonate. An example of a suitable C6-C20 alkyl benzenesulfonate is sodium dodecylbenzene sulfonate (like POLYSTEP® A-16-22 or Rhodacal® DS-4). An example of a suitable diphenyl oxide disulfonate is sodium dodecyl diphenyl oxide disulfonate (like Dowfax® 2A1). Examples of suitable ethoxylated fatty alcohols include ethoxylated mono-, di-, and trialkylphenols with EO degree from 3 to 50 and alkyl in C1 to C12, ethoxylated fatty alcohols with EO degree from 3 to 80, fatty alcohol ethoxylate, with 30EO, C13-oxo alcohol ethoxylate with 40EO (like Emulan® TO 4070), C13-oxo alcohol ethoxylate with 20EO (like Emulan® TO 2080), ceto stearyl (C16-C18) alcohol ethoxylates (like Empilan® KM80).

The monomeric composition may comprise 0 to 2%, in particular 0.1 to 1%, more particularly 0.2 to 0.5% by weight of surfactant based on the total weight of monomers a)+b)+c).

The monomeric composition may comprise 0 to 10%, in particular 0.1 to 8%, more particularly 1 to 6% by weight of surfactant based on the total weight of monomers a)+b)+c).

The monomeric composition may comprise 0 to 9.5%, in particular 0.08 to 7.5%, more particularly 0.8 to 5.7% by weight of surfactant based on the total weight of the monomeric composition.

In one embodiment, the monomeric composition comprises a buffer. The buffer may be a compound that controls and maintains the pH during the polymerization step in a controlled range, for example from 4 to 11, in particular 5 to 10. In particular, the buffer may be selected from sodium bicarbonate, sodium carbonate and sodium hydroxide. More particularly, the buffer may be sodium bicarbonate.

The monomer composition may comprise 0 to 0.5% preferably 0.01 to 0.25% of buffer based on the total weight of monomers a)+b)+c).

In one embodiment, the monomer composition comprises more than 60%, more than 70%, more than 80%, more than 90% or more than 95% by weight of monomers a), b), c), and d) based on the total weight of the monomeric composition.

In a particularly preferred embodiment, the monomeric composition comprises:

- 40 to 90%, in particular 45 to 85%, more particularly 50 to 80% of monomer a);
- 0.01 to 30%, in particular 0.1 to 20%, more particularly 1 to 10% of monomer b);
- 1 to 40%, in particular 5 to 30%, more particularly 10 to 25% of monomer c);
- 0.001 to 10%, in particular 0.1 to 5%, more particularly 0.5 to 4% of monomer d);
- 0 to 2%, in particular 0.1 to 1.5%, more particularly 0.2 to 1% of initiator;

0 to 2%, in particular 0.1 to 1.5%, more particularly 0.5 to 1% of chain transfer agent;

0 to 2%, in particular 0.1 to 1'Y°, more particularly 0.2 to 0.5% by weight of surfactant; and water wherein the % are % by weight based on the total weight of monomers a)+b)+c).

In a particularly preferred embodiment, the monomeric composition comprises:

40 to 90%, in particular 45 to 85%, more particularly 50 to 80%, even more particularly 55 to 75%, more particularly still 60 to 70%, of monomer a);

0.01 to 30%, in particular 0.1 to 20%, more particularly 1 to 10%, even more particularly 2 to 8%, more particularly still 3 to 7%, of monomer b);

1 to 40%, in particular 5 to 30%, more particularly 10 to 25%, even more particularly 15 to 25%, more particularly still 20 to 25%, of monomer c);

0.001 to 10%, in particular 0.1 to 5%, more particularly 0.5 to 4%, even more particularly 1 to 4%, more particularly still 2.5 to 4%, of monomer d);

0 to 2%, in particular 0.1 to 1.5%, more particularly 0.2 to 1% of initiator;

0 to 2%, in particular 0.1 to 1.5%, more particularly 0.5 to 1% of chain transfer agent;

0 to 2%, in particular 0.1 to 1%, more particularly 0.2 to 0.5% by weight of surfactant;

wherein the % are % by weight based on the total weight of monomers a)+b)+c).

In a particularly preferred embodiment, the monomeric composition comprises:

34 to 85%, in particular 38 to 80%, more particularly 43 to 75% of monomer a);

0.008 to 28%, in particular 0.08 to 19%, more particularly 0.8 to 9.4% of monomer b);

0.8 to 38%, in particular 4 to 28%, more particularly 8 to 24% of monomer c);

0.0008 to 9.4%, in particular 0.08 to 4.7%, more particularly 0.4 to 3.8% of monomer d);

0 to 1.7%, in particular 0.08 to 1.4%, more particularly 0.17 to 0.95% of initiator;

0 to 1.7%, in particular 0.08 to 1.4%, more particularly 0.4 to 0.95% of chain transfer agent;

0 to 9.5%, in particular 0.08 to 7.5%, more particularly 0.8 to 5.7% by weight of surfactant;

wherein the % are % by weight based on the total weight of the monomeric composition.

In particular, the total weight of monomer a), monomer b), monomer c), monomer d), initiator, other copolymerizable monomer, chain transfer agent, crosslinker, surfactant and buffer represents at least 95%, at least 96%, at least 97%, at least 98%, at least 99% or 100% of the total weight of the monomeric composition.

In particular, the total weight of monomer a), monomer b), monomer c) and monomer d) represents at least 80%, at least 85%, at least 90%, at least 92%, at least 94% of the total weight of the monomeric composition.

In particular, the total weight of monomer a), monomer b) and monomer c) represents at least 75%, at least 80%, at least 85%, at least 90%, at least 92% of the total weight of the monomeric composition.

The aqueous dispersion of the invention may be obtained according to the process described hereinafter.

Process for the Preparation of the Aqueous Dispersion

The aqueous dispersion of the invention may be obtained by emulsion polymerization of the monomeric composition as defined above.

The aqueous dispersion of the invention may be prepared using any known emulsion polymerization procedure which produces polymer dispersions in aqueous latex form. Such procedures are described in, for example, Encyclopedia of Polymer Science and Engineering, Vol. 8, p. 659 ff (1987).

Emulsion polymerization involves a system comprising water, monomers, surfactants and an initiator. The emulsion polymerization process typically starts by dispersing the monomers (organic phase) in water (aqueous phase) with the aid of surfactants to provide an emulsion. The initiator is usually dissolved in the aqueous phase and provides a source of free radicals that initiate polymerization. The dispersed monomer droplets act as reservoirs supplying monomer to the growing polymer particles by diffusion through the water. The polymer particles are prevented from coalescing with each other by the surfactant. The emulsion polymerization process therefore provides as a product an aqueous dispersion of polymer particles.

In one embodiment, the emulsion polymerization may be conducted using the following conditions. A pre-emulsion comprising monomers a), b), c) and d) and a surfactant in water may be prepared. A solution of initiator in water may be separately prepared. The pre-emulsion and solution of initiator may be continuously fed in a reactor over a time of 2 to 6 hours. The temperature of the reactor may be maintained in the range 50 to 95° C.

A step of post-polymerization may be conducted. The post-polymerization step may be performed to polymerize residual monomers. The post-polymerization step may involve the addition of a suitable red/ox system. A suitable oxidizer for the red/ox system may be tert-butyl hydroperoxide or hydrogen peroxide. A suitable reducer for the red/ox system may be ascorbic acid, sodium metabisulfite, ferrous sulfate heptahydrate, sodium ascorbate, sodium bisulfite or Bruggolite® FF6M (mixture of 2-hydroxy-2-sulfinatoacetic acid disodium salt and 2-hydroxy-2-sulfonatoacetic acid disodium salt, with or without sodium sulfite). Typically, the oxidizer employed in the red/ox system is present in an amount of 0 to 3%, in particular 0.01 to 1%, more particularly 0.05 to 0.5%, by weight based on total weight of monomers. The reducer is typically used at levels of from about 0 to about 3%, in particular 0.01 to 0.5%, more particularly 0.025% to 0.25%, by weight based on total weight of monomers.

Adhesive Composition

The adhesive composition of the invention comprises the aqueous dispersion according to the invention as described above or the aqueous dispersion obtained with the process of the invention as described above. The adhesive composition of the invention thus comprises water and polymer particles as described herein.

The adhesive composition of the invention may be considered as a wet glue. A wet glue is a non-reactive structural adhesive composition that hardens by evaporation of water. Accordingly, it does not need to be activated by water, moisture, light and/or heat to exhibit adhesive properties. The adhesive composition of the invention is not a pressure-sensitive adhesive composition. The adhesive composition is not intended to be chemically reacted with another component to form a multi-component adhesive system that hardens when the different components are mixed together.

The aqueous adhesive composition may be substantially free from a hydrophilic polymer other than the co-binders defined herein below, i.e. it may comprise less than 2%, in particular less than 1%, more particularly less than 0.5%, even more particularly 0% by weight of hydrophilic polymer based on the weight of the adhesive composition. A hydrophilic polymer may be a polymer that is at least partially soluble in water at 25° C., in particular at least 50 wt. %, at least 75 wt. %, at least 85 wt. %, or at least 95 wt. % soluble in water at 25° C. In one embodiment, the aqueous adhesive composition is substantially free from a hydrophilic polymer formed by free radically polymerized ethylenically unsaturated monomers. In particular, the aqueous adhesive composition does not comprise an acrylic-based polymer other than the aqueous dispersion of polymer particles of the invention. Hydrophilic polymers are generally obtained by free radically polymerizing ethylenically unsaturated monomers comprising an acidic group such as carboxylic acid groups, sulfonic acid groups, phosphonic acid groups and/or their salts, or combinations thereof. Hydrophilic polymers may have an acid number before neutralization of at least 400 mg KOH/g polymer, at 500 mg KOH/g polymer, at least 600 mg KOH/g of polymer, at least 700 mg KOH/g of polymer. Examples of hydrophilic polymers that may not be included in the adhesive composition of the invention are poly(meth)acrylic acid and copolymers of (meth)acrylic acid with acrylamide-2-methylpropane sulfonic acid.

The adhesive composition may comprise 45% to 75%, in particular 50% to 65%, more particularly 50% to 60%, by weight of water based on the weight of the adhesive composition.

The adhesive composition may comprise 5 to 30%, in particular 10 to 25%, more particularly 12 to 23%, by weight of polymer particles based on the weight of the adhesive composition.

The adhesive composition may further comprise a co-binder. The co-binder may be selected from a polysaccharide, casein, polyvinyl alcohol (PVA), poly(acrylamide) and mixtures thereof.

The amount of co-binder may be from 0 to 10%, in particular 2 to 8%, more particularly 5 to 7% by weight based on the weight of the adhesive composition.

In one embodiment, the co-binder comprises a polysaccharide. The polysaccharide may be selected from a starch, a starch derivative, konjac gum, glutinous rice flour, wheat gluten, and mixtures thereof. Preferably, the polysaccharide is selected from a starch, a starch derivative and mixtures thereof.

In one embodiment, the composition comprises a polysaccharide as the only the co-binder. The amount of polysaccharide may be from 0.1 to 10%, in particular 1 to 8%, more particularly 2 to 7%, even more particularly 3 to 6%, more particularly still 4 to 5%, by weight based on the weight of the adhesive composition. Such a composition may be substantially free of casein, i.e. it comprises less than 2%, in particular less than 1%, more particularly less than 0.5%, even more particularly 0% by weight of casein based on the weight of the adhesive composition.

In another embodiment, the co-binder comprises a polysaccharide and casein. The amount of polysaccharide may be from 0.1 to 10%, in particular 1 to 8%, more particularly 2 to 7%, even more particularly 3 to 6%, more particularly still 4 to 5%, by weight based on the weight of the adhesive composition and the amount of casein may be from 0.1 to 10%, in particular 1 to 8%, more particularly 2 to 7%, even more particularly 3 to 6%, more particularly still 4 to 5%, by weight based on the weight of the adhesive composition.

The adhesive composition may further comprise a plasticizer. Example of suitable plasticizers are urea, a thiocyanate and dicyandiamide. In one embodiment, the plasticizer is urea.

The amount of plasticizer may be from 0 to 30%, in particular 10 to 25%, more particularly 15 to 20% by weight based on the weight of the adhesive composition.

The adhesive composition may further comprise a base. The base may be used as a neutralizing agent. The base may be selected from ammonia water or an aqueous solution of sodium hydroxide. The introduction of a base in the adhesive composition may neutralize the acidic groups of the polymerized units derived from monomer c) and lead to an increase of viscosity of the adhesive composition.

The adhesive composition may further comprise a crosslinker. The crosslinker may be selected from halides, oxides, sulfides, and organic acid salts of metals in Group II, III, IV and VIII in the Periodic Chart of Elements. Examples of suitable crosslinkers that may be employed in this invention are metal salts of organic carboxylic, sulfonic, and sulfinic acids, zinc oxide, calcium oxide, aluminum oxide, aluminum alkoxides, iron oxide, iron sulfide, barium oxide, zinc chloride, magnesium sulfide, lead oxides, silicon dioxide, titanium dioxide, magnesium oxide, antimony trioxide, and cadmium oxide.

The adhesive composition may further comprise an additive, such as a biocide, a defoaming agent, and mixtures thereof.

In a particularly preferred embodiment, the composition further comprises a polysaccharide, urea and a base. Such a composition may be substantially free of casein.

In another particularly preferred embodiment, the composition further comprises a polysaccharide, casein, urea and a base.

A typical formulation of an adhesive composition comprising casein is shown in the following Table (the amounts are expressed in % by weight based on the weight of the composition):

| Ingredients | Amount (wt %) |
|---|---|
| Polymer particles according to the invention | 10-25 |
| Modified starch | 0.1-5 |
| Urea | 15-20 |
| Casein | 2-5 |
| Ammonia water (20% vol/vol) | 2-3 |
| Crosslinker | 0.1-2 |
| Water | q.s. 100 |

A typical formulation of a casein-free adhesive composition is shown in the following Table (the amounts are expressed in % by weight based on the weight of the composition):

| Ingredients | Amount (wt %) |
|---|---|
| Polymer particles according to the invention | 20-25 |
| Modified starch | 0.1-5 |
| Urea | 15-20 |
| Ammonia water (20% vol/vol) | 4-5 |
| Water | q.s. 100 |

Use of the Adhesive Composition

The adhesive composition of the invention may be used for adhering a label on a bottle, in particular a glass bottle, for example a beer bottle or a soda bottle.

The labels adhered with the adhesive composition of the invention exhibit excellent water resistance, in particular excellent water resistance in water at room temperature and in iced water. For example, the labels adhered on the bottles can withstand immersion in water at room temperature (20-25° C.) for 10 days or more. Further, the labels adhered on the bottles can withstand immersion in iced water (0-5° C.) for 20 days or more.

The adhesive composition may be applied on a label and the label coated with the adhesive composition may be subsequently applied on a bottle. The bottles may then be left to dry, for example during 1 or 2 days at room temperature (20-25° C.) with a humidity of less than 65%.

The invention also relates to a process for adhering a label on a bottle. The process comprises a step of applying the adhesive composition of the invention on a label and subsequently applying the label coated with the adhesive composition on a bottle. In particular, the label is applied on the bottle directly after it has been coated with the adhesive composition. Accordingly, there may be no intermediate step, such as a drying step and/or an activation with water step, between the step of applying the adhesive composition on a label and the step of applying the label coated with the adhesive composition on a bottle. The process of the invention does not comprise a step of activation with water. Indeed, the adhesive composition of the invention is a wet glue that does not require activation with water to develop adhesive properties. The process of the invention does not comprise a step of drying the label coated with the adhesive composition before it is applied on the bottle. Indeed, the adhesive composition of the invention is a wet glue that hardens by evaporation of solvent and not a pressure-sensitive adhesive. The glue is therefore dried after the label has been applied on the bottle.

The invention is further described in the following examples.

EXAMPLES

Materials and Methods

In the examples, the following compounds were used:

Sipomer® PAM 200: a phosphate ester of polypropylene glycol monomethacrylate having a molecular weight of about 500 Da available from Solvay Silquest® A-174: 3-methacryloxypropyl trimethoxysilane available from Momentive Bruggolite© FF6M: mixture of disodium salts of 2-hydroxy-2-sulfinatoacetic acid and 2-hydroxy-2-sulfonatoacetic acid at 70% by weight and sodium sulfite at 30% by weight available from Brüggemann Tackidex® I 231: cold water soluble modified waxy maize starch available from Roquette Drewplus® T-4201: non-ionic formulation comprising silica derivatives, mineral oil and esters available from Ashland Acticide® LA: mixture of 2-bromo-2-nitropropane-1,3-diol (8.80%), 5-chloro-2-methyl-4-isothiazolin-3-one (0.85%) and 2-methyl-4-isothiazolin-3-one (0.28%) available from THOR Chemical ENCOR® 4281: aqueous dispersion of alkali-soluble acrylic polymer particles having a solids content of 50% by weight, a Tg of 30° C. and a viscosity of less than 200 mPa·s available from Arkema ENCOR® 4282: aqueous dispersion of alkali-soluble acrylic polymer particles having a solids content of 50% by weight, a Tg of 17° C. and a viscosity of less than 200 mPa·s available from Arkema ENCOR® 4284: aqueous dispersion of alkali-soluble acrylic polymer particles having a solids content of 50% by weight, a Tg of 18° C. and a viscosity of less than 200 mPa·s available from Arkema The following methods were used:

Iced-Water Resistance

The labelled bottles were filled with water and vertically immersed in a water bath at a temperature of 0-5° C. The bottles were rotated 3 times every 12 hours. The time at which the label was detached from the bottle was recorded. 3 samples were tested according the above method in parallel. The test was rated as passing if 2 samples were recorded of a value of 10 days or greater.

Room Temperature Water Resistance (RT Water Resistance)

The labelled bottles were filled with water and vertically immersed in a water bath at a temperature of 25+/−5° C. The bottles were rotated 3 times every 12 hours. The time at which the label was detached from the bottle was recorded. 3 samples were tested according the above method in parallel. The test was rated as passing if 2 samples were recorded of a value of 10 days or greater.

Solid Content

The solid content was determined according to standard GB/T 2793-1995

Viscosity

The Brookfield viscosity of the aqueous dispersion (latex) was determined according to standard GB/T 2794-1995 at 23° C.

Tack

The tack of the adhesive composition was determined according to standard GB/T 4852-2002. The tack was rated with a value of 1 to 5 (5 is very good, 3 is acceptable, 1 is very poor)

Glass Transition Temperature (Tg)

The Tg of the aqueous dispersion (latex) was determined by Differential Scanning calorimetry (DSC). A latex film was applied on a PTFE plate, and dried for 48 hours at 25° C.+/−2° C. The DSC was carried out with a temperature increase of −30 to 60° C. with a rate of 10° C./min.

Flowability

The flowability of the adhesive composition was determined based on a combination of the following internal tests (rod+pouring) on a freshly prepared adhesive composition stored in a container at 25° C.+/−2° C. for 24 hours. The rod test method was (a) A glass rod with a diameter of 0.6 cm was placed in the adhesive composition. The adhesive composition was manually gently agitated with the glass rod. (b) The glass rod was pulled away from the container. The appearance of the adhesive composition between the container and the rod was visually appreciated. A honey-like glue appeared like a continuous line whereas a poorly flowing glue easily broke off. The pouring test was (a) The adhesive composition was gently poured from the container. The adhesive composition should flow continuously under gravity from the container. The flowability was rated with a value of 1 to 5 (5 is very good, 3 is acceptable, 1 is very poor).

Adhesion on Glass

The adhesion on glass was determined according to GB/T 2790-1995. The adhesion on glass was rated with a value of 1 to 5 (5 is very good, 3 is acceptable, 1 is very poor).

Washability

The washability of the labels was determined by the following internal method. (a) Labels (70 cm×110 cm) were attached to glass bottles with the adhesive composition. (b) They were dried in standard conditions, 23° C.+/−2° C., 50-60% Relative Humidity for 48 hours. (c) After drying, the labelled bottles were filled with water at 80° C., and immersed into a 2.5% wt solution of sodium hydroxide solution at 80° C. The washability was rated with a value of 1 to 5 (5 is very good, 3 is acceptable, 1 is very poor).

Example 1: Preparation of an Aqueous Dispersion According to the Invention

An aqueous dispersion comprising the following constituents was prepared:

| Part | Function | Constituent | % by weight of monomers a) + b) + c) |
|---|---|---|---|
| A | | demineralized water | 55 |
| B | initiator | ammonium persulfate | 0.1 |
| | | demineralized water | 1 |
| C | monomer a) | ethyl acrylate | 55 |
| | | methyl methacrylate | 18 |
| | monomer b) | styrene | 5 |
| | monomer c) | methacrylic acid | 20 |
| | | Sipomer ® PAM 200 | 2 |
| | monomer d) | Silquest ® A-174 | 3 |
| | chain transfer agent | n-Dodecyl Mercaptan | 0.6 |
| | surfactant | mixture of sodium dodecyl sulfate and sodium dioctyl sulphosuccinate | 5 |
| | | demineralized water | 26 |
| D | initiator | ammonium persulfate | 0.4 |
| | | demineralized water | 4 |
| E | oxidizer | tert-butyl hydroperoxide | 0.1 |
| | | water | 1 |
| F | reducer | Bruggolite © FF6M | 0.1 |
| | | water | 1 |

The aqueous dispersion was prepared with the following process:

Part A was introduced in a three-liter, jacketed glass reactor equipped with stirrer (dual impeller type), reflux condensers, and stainless steel or PTFE feed lines. The reactor was then heated to 78° C. Parts B, C, D, E and F were prepared in advance (see Table below).

When the required temperature was reached and stable, Part B was added to the reactor. The temperature was maintained at 78° C. for 10 minutes. Then Part C and Part D were continuously fed to the reactor. The feeding lasted 270 minutes with proper stirring. After feeding, the reaction was post held for 1 hour at 85° C.

The reactor was cooled to below 70° C. before carrying out post-treatment with red/ox (residual monomer polymerization). Parts E and F were continuously fed to the reactor. The feeding lasted 60 minutes with proper stirring. After feeding, the reaction was post held for 1 hour at 70° C. Water was then added to adjust the solids content to 45% by weight.

The aqueous dispersion exhibits a viscosity of less than 800 mPa·s.

The Tg of the polymer particles is 24° C.

Example 2: Preparation of an Adhesive Composition According to the Invention

An adhesive composition comprising the following constituents was prepared:

| Function | Ingredients | Parts by weight |
|---|---|---|
| Binder | aqueous dispersion of Example 1 (solids content of 45 wt %) | 40 |
| Co-binder | Modified starch | 5 |
| Plasticizer | urea | 15 |
| Co-binder | casein | 5 |
| Neutralizing agent | solution of ammonium hydroxide (20 wt %) | 3 |
| Crosslinker | zinc oxide | 0.6 |
| Defoamer | Drewplus ® T-4201 | 0.05 |
| Biocide | Acticide ® MBS | 0.1 |
| | water | q.s. 100 |

The adhesive composition was prepared with the following process:

The aqueous dispersion of Example 1 was introduced in a reactor under agitation. The co-binders and urea were then added. Ammonia water was then added and the mixture was heated at 75° C. for 1 to 2 hours. After cooling to 60° C., the crosslinker was added and the mixture was left to react for 0.5 to 1 hours. After cooling to 44° C., the defoamer and biocide were added in the reactor. Water was then added to adjust the solids content to 45% by weight.

Example 3: Comparative Adhesive Compositions

Comparative adhesive compositions were prepared according to Example 2 by replacing the aqueous dispersion of Example 1 with a commercially available aqueous dispersion at a comparable level of solids content. The following dispersions were tested:

Comp. Ex. 1: ENCOR® 4281

Comp. Ex. 2: ENCOR® 4282

Comp. Ex. 3: ENCOR® 4284

The polymer particles of the aqueous dispersions used in the comparative examples do not comprise polymerized units derived from an ethylenically unsaturated monomer comprising a silane group.

Example 4: Applicative Properties and Performances

The adhesive composition of Example 2 and the comparative adhesive compositions of Example 3 were applied to a 70×110 mm paper label (commercial labels of Snow beer) in an amount of 30 g/m2. The label coated with the adhesive was applied on a glass bottle, and then dried for 1-2 days at room temperature (20-25° C.) with a relative humidity of less than 65%.

The performances are detailed in the table below:

| Adhesive composition | Flowability | Adhesion on glass | Adhesion on PET | Tack | Iced water resistance | RT water resistance | Washability |
|---|---|---|---|---|---|---|---|
| Example 2 | 5 | 5 | 3 | 5 | >20 days | ≥10 days | 4 |
| Comp. Ex 1 | 5 | 5 | 2 | 5 | 1-2 days | ≤1 day | 5 |
| Comp. Ex 2 | 3 | 5 | 4 | 3 | 3-4 days | 2 days | 4 |
| Comp. Ex 3 | 3 | 5 | 4 | 3 | >15 days | ≤7 days | 3 |

The adhesive composition of the invention exhibits excellent flowability, adhesion on glass and tack. It has a much higher iced water resistance and room temperature resistance compared to the formulations of Comp. Ex 1-4. The label can withstand more than 20 days in iced water and more than 10 days in room temperature water. The label is easily removed under alkaline conditions which ensures recyclability of the bottle.

The invention claimed is:

1. An adhesive composition comprising:

an aqueous dispersion of polymer particles;

a polysaccharide;

urea; and a base, wherein the aqueous dispersion of polymer particles is obtained from a monomeric composition comprising:

a) a non-ionic aliphatic monoethylenically unsaturated monomer;

b) a non-ionic styrenic monomer;

c) an ethylenically unsaturated monomer comprising an acidic group and salts thereof, and d) an ethylenically unsaturated monomer comprising a silane group, and wherein the monomer a) comprises at least 50% by weight of C1-C4 alkyl (meth) acrylate based on the total weight of the monomer a).

2. The adhesive composition according to claim 1, further comprising casein.

3. A process for adhering a label on a bottle, wherein the process comprises applying the adhesive composition according to claim 1 on a label and subsequently applying the label coated with the adhesive composition on a bottle.

4. The adhesive composition according to claim 1, wherein monomer a) further comprises a monomer selected from a hydroxyalkyl (meth) acrylate, an optionally substituted (meth) acrylamide, (meth) acrylonitrile, a conjugated diene, an alpha-olefin, a vinyl ester, a vinyl ether, a vinyl halide, and mixtures thereof.

5. The adhesive composition according to claim 1, wherein monomer a) comprises a mixture of C1-C4alkyl (meth) acrylates.

6. The adhesive composition according to claim 1, wherein the monomeric composition comprises 40% by weight to 90% by weight of monomer a) based on the total weight of monomers a)+b)+c).

7. The adhesive composition according to claim 1, wherein monomer b) is selected from styrene, alpha-methylstyrene, tert-butylstyrene, ortho-, meta-, and para-methylstyrene, ortho-, meta-and para-ethylstyrene, o-methyl-p-isopropylstyrene, p-chlorostyrene, p-bromostyrene, o,p-dichlorostyrene, o,p-dibromostyrene, ortho-, meta-and para-methoxystyrene, optionally substituted indenes, optionally substituted vinylnaphthalenes, acenaphthylene, diphenylethylene, vinyl anthracene and mixtures thereof.

8. The adhesive composition according to claim 1, wherein the monomeric composition comprises 0.01% by weight to 30% by weight of monomer b) based on the total weight of monomers a)+b)+c).

9. The adhesive compositon to claim 1, wherein monomer c) comprises a carboxylic acid (—COOH) group, a carboxylate ($—COO^-$) group, a phosphonic acid ($—P(=O)(OH)_2$) group, a phosphonate ($—P(=O)(OR)_2$) group, a sulfonic acid ($—S(=O)_2OH$) group, a sulfonate ($—S(=O)_2OR$) group, a phosphate ($—O—P(=O)(OR)_2$) group, wherein each R is independently a counterion, a hydrogen atom, or an optionally substituted hydrocarbyl and mixtures thereof.

10. The adhesive composition according to claim 1, wherein monomer c) comprises a mixture of a C3-C10 mono-or dicarboxylic acid monomers and a phosphorous-based acid monomer.

11. The adhesive composition according to claim 1, wherein monomer c) comprises a mixture of a C3-C10 mono-or dicarboxylic acid monomer and a sulfur-based acid monomer.

12. The adhesive composition according to claim 1, wherein monomer c) comprises at least 50% by weight of C3-C10 mono-or dicarboxylic acid monomer based on the total weight of monomer c).

13. The adhesive composition according to claim 1, wherein the monomeric composition comprises 1% by weight to 40% by weight of monomer c) based on the total weight of monomers a)+b)+c).

14. The adhesive composition according to claim 1, wherein monomer d) is a monoethylenically unsaturated monomer comprising a dialkoxysilane or a trialkoxysilane group and mixtures thereof.

15. The adhesive composition according to claim 1, wherein the monomeric composition comprises 0.001% by weight to 10% by weight of monomer d) based on the total weight of monomers a)+b)+c).

16. The adhesive composition according to claim 1, wherein the monomeric composition further comprises an initiator and mixtures thereof.

17. The adhesive composition according to claim 1, wherein the monomeric composition further comprises a chain transfer agent.

18. The adhesive composition according to claim 1, wherein the monomeric composition further comprises a surfactant and mixtures thereof.

19. The aqueous dispersion adhesive composition according to claim 1, wherein the polymer particles have a Tg of −10° C. to 50° C.

20. The adhesive composition according to claim 1, wherein the adhesive composition does not need to be activated by water, moisture, light and/or heat to exhibit adhesive properties.

* * * * *